(12) United States Patent
Al-Rihawi

(10) Patent No.: US 11,041,330 B2
(45) Date of Patent: Jun. 22, 2021

(54) SEAL FOR A LATCH

(71) Applicant: Kiekert AG, Heiligenhaus (DE)

(72) Inventor: Wael Ghassen Al-Rihawi, Redford, MI (US)

(73) Assignee: Kiekert AG, Heiligenhaus (DE)

(*) Notice: Subject to any disclaimer, the term of this patent is extended or adjusted under 35 U.S.C. 154(b) by 764 days.

(21) Appl. No.: 15/713,879

(22) Filed: Sep. 25, 2017

(65) Prior Publication Data

US 2019/0093395 A1 Mar. 28, 2019

(51) Int. Cl.
| | | |
|---|---|---|
| *E05B 77/34* | (2014.01) | |
| *E05B 85/02* | (2014.01) | |
| *E05B 17/00* | (2006.01) | |
| *F16J 15/02* | (2006.01) | |
| *E05B 77/40* | (2014.01) | |
| *E05B 77/38* | (2014.01) | |
| *E05B 15/02* | (2006.01) | |

(Continued)

(52) U.S. Cl.
CPC ............ *E05B 77/34* (2013.01); *E05B 17/002* (2013.01); *E05B 85/02* (2013.01); *F16J 15/021* (2013.01); *E05B 15/02* (2013.01); *E05B 15/022* (2013.01); *E05B 15/0255* (2013.01); *E05B 77/36* (2013.01); *E05B 77/38* (2013.01); *E05B 77/40* (2013.01); *E05B 85/045* (2013.01); *Y10T 292/1047* (2015.04); *Y10T 292/62* (2015.04); *Y10T 292/68* (2015.04); *Y10T 292/685* (2015.04); *Y10T 292/688* (2015.04)

(58) Field of Classification Search
CPC ........ E05B 77/34; E05B 17/002; E05B 77/38; E05B 77/36; E05B 77/40; E05B 15/0255; E05B 15/02; E05B 15/022; E05B 85/02; E05B 85/045; Y10T 292/688; Y10T 292/68; Y10T 292/685; Y10T 292/1047; Y10T 292/62; F16J 15/021
See application file for complete search history.

(56) References Cited

U.S. PATENT DOCUMENTS

| | | | | |
|---|---|---|---|---|
| 2001/0010428 A1* | 8/2001 | Franz | .................... | E05B 15/029 292/219 |
| 2009/0322119 A1 | 12/2009 | Fannon | | |

(Continued)

FOREIGN PATENT DOCUMENTS

| | | |
|---|---|---|
| DE | 4103142 A1 | 8/1992 |
| DE | 19955254 A1 | 5/2001 |

(Continued)

OTHER PUBLICATIONS

International Search Report and Written Opinion dated Nov. 14, 2018 for related International Application No. PCT/IB2018/001075.

*Primary Examiner* — Kristina R Fulton
*Assistant Examiner* — Faria F Ahmad
(74) *Attorney, Agent, or Firm* — Renner, Otto, Boisselle & Sklar, LLP

(57) ABSTRACT

The object of the invention is a seal (10) for an inlet opening (120) of a latch (100), in particular a motor vehicle latch, having at least a partially flexible sealing element (11) with at least an insertion slot (12), whereby a first seal wing (11.1) and a second seal wing (11.2) are formed on the sealing element (11), whereby a striker can at least be partially arranged in the inlet slot (11).

14 Claims, 2 Drawing Sheets

Figure 3:
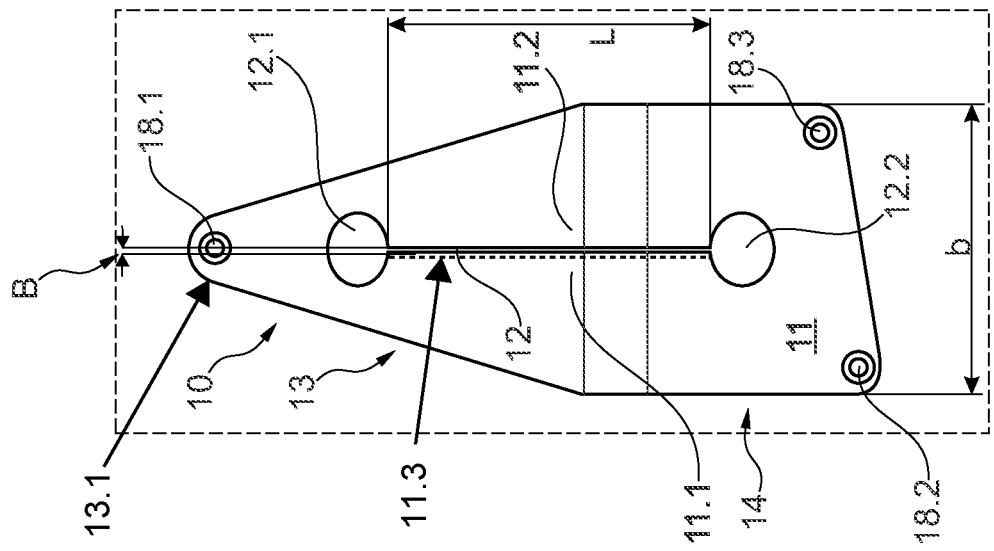

(51) Int. Cl.
*E05B 77/36* (2014.01)
*E05B 85/04* (2014.01)

(56) References Cited

U.S. PATENT DOCUMENTS

| | | | | |
|---|---|---|---|---|
| 2012/0112477 A1* | 5/2012 | Muramatsu | ............ | E05B 77/36 |
| | | | | 292/340 |
| 2019/0226233 A1* | 7/2019 | Yalamati | ................. | E05B 9/002 |
| 2020/0080355 A1* | 3/2020 | Tung | .................... | E05B 15/022 |

FOREIGN PATENT DOCUMENTS

| | | | |
|---|---|---|---|
| DE | 202012000931 U1 | | 5/2013 |
| JP | 2008143399 A | * | 6/2008 |
| JP | 2014223826 A | * | 12/2014 |
| KR | 20110003870 A | | 1/2011 |

\* cited by examiner

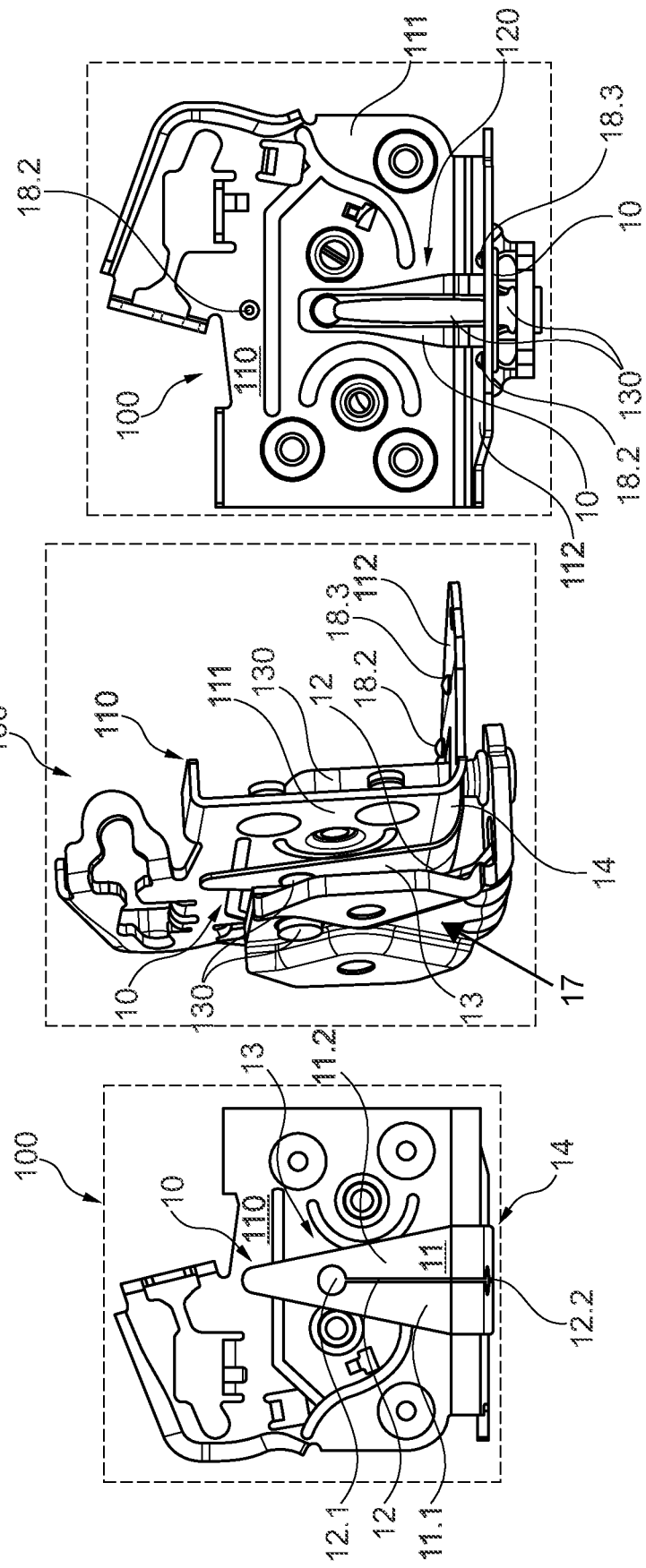

SEAL FOR A LATCH

The invention relates to a seal for an inlet opening of a latch, in particular a motor vehicle latch according to the first independent patent claim. Furthermore, the invention relates to a latch for a moving component of a motor vehicle, in particular for a door, flap, tailgate or hood according to the further independent patent claim.

Latches, in particular motor vehicle latches are exposed to external environmental influences, so that for example dust, dirt and/or sand can penetrate into the closure mechanism, whereby the functionality of the latch can no longer be guaranteed.

The task of the present invention is to at least partially rectify the problems known from the state of the art stated above. The task of the present invention is in particular to protect the latch mechanism from external environmental influences at least to the greatest possible extent.

The task is solved on the one hand by a seal for an inlet opening of a latch according to the first independent patent claim and by a latch for a moving component of a motor vehicle according to the further independent patent claim.

Advantageous further formations and improvements of the invention are stated in the sub-claims. It is pointed out that the execution examples described below for explanation of the invention are not restrictive, but instead numerous combination and variation options of the characteristics described in the description, the drawings and the sub-claims for execution of the invention result. Characteristics and details apply which have been described in conjunction with the seal according to the invention, naturally also in conjunction with the latch according to the invention and respectively vice versa, so that with regard to the disclosure on the individual invention aspects reference is always made or can be made reciprocally.

According to the first invention aspect, a seal is stressed for an inlet opening of a latch, having at least a partially flexible sealing element with at least an insertion slot, whereby a first seal wing and a second seal wing are formed on the sealing element, whereby a striker can at least be partially arranged in the inlet slot. Arrangeable can also be understood to mean an insertion or execution of a striker within the scope of the invention. The seal proposed according to the invention is formed in particular for use in a motor vehicle latch, whereby preferably door latches, flap latches, tailgate latches or hood latches should be understood thereby. The at least partially flexible sealing element is formed with at least an inlet slot, whereby the inlet slot is provided for insertion and/or execution of the striker. The insertion slot is preferably formed vertically in the sealing element, whereby a first and second seal wing are formed to the side of the inlet slot, so that the first and/or second seal wing are preferably formed in an at least partially moving manner. Thus, the striker can be inserted and/or executed by the inlet slot in such a way that the at least one seal wing can be deformed or moved by the striker. The seal wings can thus be adjacent on two sides on the striker, whereby preferably the striker is at least partially surrounded by the seal wings of the sealing elements in a form-fitting manner. Accordingly, the seal wings offer seal functionality in such a way that the striker is at least partially arranged in the sealing element and simultaneously the areas outside of the striker or around the striker are sealed by the seal, in particular the first and/or second seal wing in such a way that at least fundamentally no external environmental impacts can penetrate into the latch mechanism.

Advantageously, the sealing element can have a first section and a second section arranged at an angle to the first section, whereby in particular between the first section and the second section an angle α is present between approximately 45° and approximately 145°, preferably between approximately 60° and approximately 120°, most preferably between approximately 80° and approximately 105°. The angular sealing element can thus preferably be adjusted to the geometry of the latch housing of the latch. Accordingly, the sealing element of the seal cannot only be arranged on a single side of the latch housing, but instead on at least two sides of the latch housing. The inlet opening for the striker usually extends on at least two sides of a latch housing, so that it is preferable if the sealing element extends along the complete inlet opening. The flexible sealing element can, for example, be manufactured in a pre-formed manner so that simplified installation can be executed on the latch housing of the latch. The angled area of the sealing element can preferably be formed in a rounded manner, whereby in particular the geometry can be formed in a complementary manner to the latch housing in the area of the angled area, so that a fundamentally form-fitting arrangement of the sealing element can be attained on a latch housing.

It is conceivable that the inlet slot extends from the first section into the second section, whereby in particular the inlet slot has a length L between approximately 10 mm and approximately 150 mm, preferably between approximately 25 mm and approximately 100 mm, most preferably between 50 mm and approximately 80 mm. Furthermore, the inlet slot can have a width B between approximately 0.1 mm and approximately 20 mm, preferably between approximately 2 mm and approximately 10 mm. It is preferable when the inlet slot extends from one part of the first section continuously into a part of the second section, whereby in particular the inlet slot can also extend in the angular area of the sealing element. The length of the inlet slot can be formed independently of the geometry of the striker. The inlet slot is preferably dimensioned in such a way that the striker can be inserted through the inlet slot, being in contact with the sealing element.

It can be advantageous if at least one insertion opening is formed at the start and end of the inlet slot, whereby in particular the inlet opening is formed as a circle, a rectangle or an oval. An insertion opening on the insertion slot of the sealing element is preferably geometrically complementary to the cross-section of the striker. Accordingly, the striker can be arranged in a form-fitting manner in the insertion opening of the sealing element. In order that the at least angular striker can be surrounded in at least two places by the sealing element, the sealing element has two insertion openings, whereby a first insertion opening is arranged at a start of the inlet slot and a second opening at an end of the inlet slot. These points usually form the sections of the striker in which the striker is arranged in the latch housing with the door closed. The latch mechanism can thus also be protected from external environmental influences with the door closed and the striker inserted. It is preferable that the inlet slot does not extend completely over the sealing element and thus divides it in two.

Advantageously, a brush element can at least be arranged in the area of the inlet slot, whereby the brush element partly seals and/or covers the inlet slot. A brush element according to the invention preferably has a multitude of flexible bristles which can be deformed by these on insertion of the striker into the insertion opening. The flexibility of the bristles of the brush element enable a sealing effect in the area of the inlet slot to be increased. Accordingly, it is conceivable that the inlet slot is at least partly sealed or covered by the brush elements so that no external environmental influences can penetrate through the inlet slot. However, at the same time the flexibility of the sealing element is retained.

Furthermore, it is conceivable that the first seal wing and the second seal wing are formed or arranged at least partly overlapping. The first and/or second seal wing can be arranged over one another accordingly in such a way that these touch and move away or are moved only on insertion of the striker. The overlapping of the seal wing thus causes the inlet slot not to be penetrated by minute dust particles. Instead, the inlet slot only opens when the striker is moved by the sealing element. The sealing function of the seal according to the invention can thus be further increased.

Within the scope of the invention, it is conceivable that the first section is fundamentally triangular and the second section is fundamentally rectangular, whereby in particular on a sharp end of the first section at least one affixing element is arranged and at least one affixing element is arranged in the second section of the seal or the sealing element. Preferably at least two fixing elements arranged at a diametrical distance from one another are provided for affixing of the seals to a latch housing. According to the invention, the first section can be fundamentally triangular and the second section, formed as a single component with the first section, can have a fundamentally rectangular shape. The shape of the sealing element or the sections can be advantageously adjusted to the geometry of the inlet opening of the latch. At least two affixing elements are preferably arranged on the sealing element so that the seal can be arranged on the latch at least two affixing points. Affixing elements are preferably formed as clip, ratchet, clamping, plug and/or screw connections. Furthermore, it is conceivable that the seal or the sealing element are connected in a material-uniform manner and/or in a form-fitting manner by means of an adhesive wing with the latch housing, for example. Furthermore, combined connection types can be provided for so that in addition to a clip, ratchet, clamping and/or plug-in connection, an adhesive connection is also provided for. The adhesive connection has the advantage in particular that a sealing effect can be produced in the area of the adhesive surface.

Advantageously, the sealing element can be formed translucently and/or reflectively, at least in sections. Most preferably, the sealing element can be formed as luminous and/or capable of being illuminated, at least in sections or have the color of the motor vehicle door and/or the latch. The sealing element preferably has polymer and/or rubber, especially polyurethane rubber. Polyurethane rubber has an excellent abrasion resistance, an excellent oil, oxygen and ozone resistance. Furthermore, a flexible design can be attained at both high and low temperatures, in addition to dynamic load-bearing capacity. A translucent formation enables a light source arranged in the latch to radiate through the sealing element. A reflective formation enables light, for example, radiating from another car or bicycle onto an open door to be reflected so that the door position can be ascertained as a result.

According to the second aspect of the invention, a latch for a moving part of a vehicle, in particular for a door, flap, tailgate or hood is stressed. The latch has at least a latch housing and an inlet opening formed on the latch housing for a latch holder, whereby a seal according to the invention is arranged at least on the inlet opening. Due to the seal on the inlet opening of the latch housing according to the invention, it is at least partly sealed and is thus protected from external environmental influences.

Accordingly, all advantages result for the latch according to the invention, as have already been described in conjunction with the seal according to the invention and respectively vice versa.

Advantageously, the seal can be arranged on the latch housing at least in sections flush-mounted and/or in a form-fitting manner. The sealing effect of the seal on the latch housing is thus improved. Accordingly, no or fundamentally no external environmental influences such as dirt, sand or dust can penetrate into the latching mechanism of the latch.

According to the invention, it is conceivable that the first section of the sealing element is attached on a first wall of the latch housing and the second section of the sealing element is attached on a second wall distinguished from the first wall of the latch housing. The second wall is preferably arranged at an angle to the first wall. A latch housing of the type is usually constructed. The seal according to the invention thus extends over at least two walls of the latch housing, in particular on the walls on which the inlet opening is arranged/formed for the striker.

Hereinafter the invention is explained in further detail with reference to the attached drawings on the basis of some preferred execution examples. The characteristics portrayed can be advantageous individually or in combination with other characteristics of the description and also the patent claims individually or in combination. It must be heeded that the figures are only descriptive and are not intended to restrict the invention in any way.

The same or equivalent elements are described by the same reference numbers in the following exemplary embodiments and their duplicate description is dispensed with.

Figure 2:
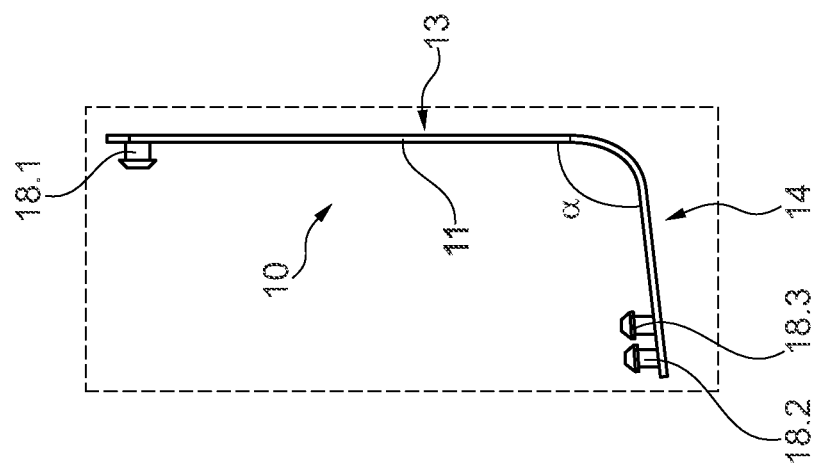
Figure 1:
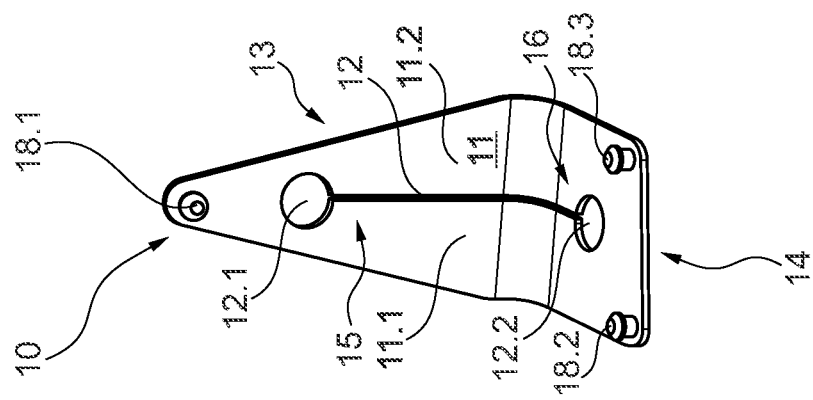

The following are shown:

FIG. 1 a possible execution form of a seal according to the invention,

FIG. 2 the execution form of the seal from FIG. 1 from a different perspective,

FIG. 3 a further possible execution form of a seal according to the invention,

FIG. 4 a section of a possible execution form of a latch according to the invention, FIG. 5 a possible execution form of the latch according to the invention from a lateral view and FIG. 6 the execution form of FIG. 5 from a further perspective.

FIG. 1 shows a first possible execution form of a seal 10 according to the invention. The seal 10 has a sealing element 11 with a first seal wing 11.1 and a second seal wing 11.2, whereby between the first seal wing 11.1 and the second seal wing 11.2 an inlet slot 12 is arranged. The inlet slot extends from a first section 13, in particular from a sharp end 13.1 of the first section 13 into a second section 14. The execution form of the seal 10 in FIG. 1 is angular, whereby the first section 13 is at an angle to the second section 14. An insertion opening 12.1 is arranged at the start 15 and an insertion opening 12.2 is arranged at the end 16 respectively at the start 15 of the insertion slot 12 and at the end 16 of the inlet slot 12. In the present execution example, the insertion opening 12.1 and the insertion opening 12.2 are formed in a circular manner in the sealing element. In FIG. 1, the first section 13 of the sealing element 11 is fundamentally triangular. An affixing element 18.1 is formed in the sharp end 13.1 of the first section 13. The affixing element 18.1 is formed as a plug-in connection with a hemispherical/mushroom head-shaped geometry. Two affixing elements 18.2 and 18.3 are arranged in the second section 14 of the sealing element 11. The second section 14 which is fundamentally rectangular has an affixing element 18.2 and 18.3 respectively on its external corners. The affixing elements 18.2 and 18.3 are formed in FIG. 1, analogously to the first affixing element 18.1.

An execution form of the seal 10 according to the invention is shown from a lateral view in FIG. 2. The seal 10 has a sealing element 11, whereby the sealing element 11 has a first section 13 and a second section 14, whereby the first section 13 and the second section 14 are arranged at a distance with an angle α. According to the invention, the angle α can be between approximately 45° and approximately 145°, preferably between approximately 60° and approximately 120°, most preferably between approximately 80° and approximately 105°. Furthermore, FIG. 2 shows three affixing elements 18.1, 18.2 and 18.3, whereby the affixing element 18.1 is arranged at the upper end of the first section 13 and the affixing elements 18.2 and 18.3 are arranged on the second section or at the end of the second section 14.

FIG. 3 shows the execution form from FIG. 1, whereby in FIG. 3 the sealing element 11 has no angular geometry. In FIG. 3, the sealing element 11 has an insertion slot 12, whereby the sealing element 11 has a first seal wing 11.1 and a second seal wing 11.2. At the ends of the insertion slot 12 insertion openings 12.1 and 12.2 are formed as circular material recesses. The striker can be arranged fundamentally in a form-fitting manner into the circular insertion openings 12.1, 12.2. According to the invention, the sealing element 11 of the seal 10 can have a width between approximately 10 mm and approximately 100 mm, preferably between approximately 20 mm and approximately 80 mm, most preferably between approximately 30 mm and approximately 60 mm.

Furthermore, it is conceivable that the first seal wing 11.1 and the second seal wing 11.2 are formed or arranged at least partly overlapping at section 11.3. The first and/or second seal wing 11.1, 11.2 can be arranged over one another accordingly in such a way that they touch and move away or are moved only on insertion of the striker. The overlapping region 11.3 of the seal wing 11.1, 11.2 thus causes the insertion slot 12 not to be penetrated by minute dust particles. Instead, the insertion slot 12 only opens when the striker is moved by the sealing element.

FIG. 4 shows a possible execution form of a latch 100 according to the invention with a latch housing 110 and a seal 10 according to the invention arranged on the latch housing 110. The seal 10 is equipped with a sealing element 11, whereby the sealing element 11 has an insertion slot 12, whereby the sealing element has a seal wing 11.1 and a seal wing 11.2. Furthermore, the seal 10 in FIG. 4 includes an insertion opening 12.1 and an insertion opening 12.2 on the respective ends of the insertion slot 12 of the sealing element 11. In FIG. 4 the sealing element 11 is angular, whereby the first section 13 of the sealing element 11 is arranged on a first wall of the latch housing 110 and the second section 14 of the sealing element 11 is arranged on a second wall of the latch housing 110. The seal 10 is preferably arranged or affixed to the sealing element 11 on the latch housing 110 in a form-fitting manner.

An execution form of a section of a latch 100 according to the invention is shown from a lateral view in FIG. 5. The latch 100 hereby has a latch housing 110. A seal 10 according to the invention is arranged on the latch housing 110, so that an inlet opening of the latch housing 110 is sealed. A striker 130 is arranged in the inlet opening and thus also in sections in the seal 10. The seal 10 is fundamentally arranged in a form-fitting manner around the striker 130, at least in sections. The striker 130 is usually moved from a position situated on the left side in the image through the sealing element 11 into the position shown. The striker 130 penetrates the seal 10 in the area of the insertion slot 12. Furthermore, the striker 130 extends through the insertion openings of the sealing element 11 provided for according to the invention. Furthermore, FIG. 5 shows a first housing wall 111 and a second housing wall 112 arranged at an angle thereto. The seal 10 extends from the first housing wall 111 into the second housing wall 112. The complete inlet opening of the latch housing 110 of the seal 10 is thus fundamentally sealed. Furthermore, two affixing elements 18.2 and 18.3 are shown in FIG. 5, whereby the second section 14 of the seal 10, is affixed on the second wall 112 of the latch housing 110.

Advantageously, a brush element 17 can at least be arranged in the area of the insertion slot 12, whereby the brush element 17 partly seals and/or covers the insertion slot 12. A brush element according to the invention preferably has a multitude of flexible bristles which can be deformed by these on insertion of the striker into the insertion opening. The flexibility of the bristles of the brush element 17 enables a sealing effect in the area of the insertion slot 12 to be increased.

FIG. 6 shows the latch 100 of the execution form from FIG. 5 from a further perspective. The latch housing 110 is hereby shown from the reverse. The latch housing 110 hereby has an inlet opening 120, through which the striker 130 can be conducted. The seal 10 according to the invention is arranged on a side of the latch housing 110 not shown here, which is illustrated in FIG. 4. In FIG. 6 the sealing element 11 of the seal 10 is arranged in such a way that the inlet opening 120 is sealed. The striker 130 is also arranged in the seal 10 or sealing element 11 of the seal 10 in such a way that the seal 10 extends around the striker 130 in a form-fitting manner. The seal 10 according to the invention is fixed by means of an affixing element 18.1 to the first section and on the first wall 111 of the latch housing 110 and by means of two further affixing tools 18.2 and 18.3 on a second wall 112 of the latch housing 110 arranged at an angle to the first wall 111. The affixing tools 18.1, 18.2 and 18.3 extend through the latch housing 110.

The foregoing explanation of the exemplary embodiments describes the present invention exclusively within the scope of examples. Naturally, individual characteristics of the exemplary embodiments, where technically sensible, can be freely combined with one another without departing from the scope of the present invention.

LIST OF REFERENCE SYMBOLS

10 Seal
11 Sealing element
11.1 Seal wing of 11
11.2 Seal wing of 11
12 Insertion slot
12.1 Insertion opening of 12
12.2 Insertion opening of 12
13 First section of 11
13.1 Sharp end of 13
14 Second section of 11
15 Start of 12
16 End of 12

17 Brush element
18.1 Affixing element
18.2 Affixing element
18.3 Affixing element
100 Latch
110 Latch housing
111 Wall of 110
112 Wall of 110
120 Inlet opening
130 Striker
α Angle between 13 and 14
L Length of 12
B Width of 12
B Width of 11

The invention claimed is:

1. A seal for an inlet opening of a motor vehicle latch, the seal comprising at least a partially flexible sealing element with at least an insertion slot, wherein a first seal wing and a second seal wing are formed on the sealing element, whereby a striker can at least be partially arranged in the insertion slot, wherein the first seal wing and the second seal wing are formed in an overlapping manner, at least in sections.

2. The seal according to claim 1, wherein the sealing element has a first section and a second section arranged at an angle to the first section, wherein the angle is between 45° and 145°.

3. The seal according to claim 1, wherein the insertion slot extends from the first section to the second section and has a length between 10 mm and 150 mm.

4. The seal according to claim 1, wherein at least one insertion opening is formed at a start and an end of the insertion slot.

5. The seal according to claim 1, wherein a brush element is arranged in the area of the insertion slot, whereby the brush element at least partly seals the insertion slot.

6. The seal according to claim 2, wherein the first section is triangular and the second section is rectangular, whereby on a sharp end of the first section at least one affixing element is arranged and at least one affixing element is arranged in the second section.

7. The seal according to claim 1, wherein the sealing element is at least partly translucent and/or reflective.

8. A latch for a moving component of a motor vehicle with a latch housing and an inlet opening formed on the latch housing for a striker, whereby at least a seal on the inlet opening is arranged according to claim 1, whereby the inlet opening is at least partly sealed.

9. The latch according to claim 8, wherein the seal is arranged on the latch housing in a form-fitting manner at least in part.

10. The latch according to claim 8, wherein a first section of the sealing element is attached on a first wall of the latch housing and a second section is attached on a second wall different from the first wall.

11. The seal according to claim 2, wherein the angle is between 80° and 105°.

12. The seal according to claim 3, wherein the length is between 25 mm and 100 mm.

13. The seal according to claim 12, wherein the length is between 50 mm and 80 mm.

14. The seal according to claim 4, wherein the at least one insertion opening is formed as a circle, rectangle, or oval.

\* \* \* \* \*